United States Patent [19]

Kookootsedes et al.

[11] Patent Number: 4,528,243
[45] Date of Patent: Jul. 9, 1985

[54] METHOD FOR SURFACE TREATMENT OF POLYORGANOSILOXANE GEL-FILLED CONTAINERS TO PREVENT BUBBLE MIGRATION INTO SAID GEL

[75] Inventors: Gust J. Kookootsedes; Herschel H. Reese, both of Midland, Mich.

[73] Assignee: Dow Corning Corporation, Midland, Mich.

[21] Appl. No.: 661,534

[22] Filed: Oct. 16, 1984

[51] Int. Cl.³ .................. B32B 27/40; B05D 3/02
[52] U.S. Cl. .................. 428/425.5; 427/407.1; 427/407.3; 427/409; 427/410; 427/412.1; 428/448; 428/450
[58] Field of Search .................. 427/387, 388.2, 393.6, 427/389.8, 258, 269, 284, 287, 96, 407.1, 407.3, 409, 410, 412.1; 428/423.3, 425.5, 447, 448, 450; 156/308.4

[56] References Cited

U.S. PATENT DOCUMENTS

| | | | |
|---|---|---|---|
| 4,070,224 | 1/1976 | Zemlin et al. | 428/425.5 X |
| 4,122,127 | 10/1978 | Mikami et al. | 428/450 X |
| 4,163,082 | 7/1979 | Romenesko | 428/447 |
| 4,278,707 | 7/1981 | Biran | 427/96 |
| 4,332,844 | 6/1982 | Hamada et al. | 427/387 |
| 4,477,499 | 10/1984 | Doin et al. | 427/412.1 |
| 4,477,517 | 10/1984 | Rummel | 428/450 X |
| 4,478,895 | 10/1984 | Makami et al. | 427/409 X |
| 4,490,496 | 12/1984 | Maekawa et al. | 427/96 X |

*Primary Examiner*—Thurman K. Page
*Attorney, Agent, or Firm*—Robert Spector

[57] ABSTRACT

Bubble migration from a surface of a container or other substrate into a polyorganosiloxane gel that is in contact with the surface can be substantially eliminated by coating the surface with a liquid composition comprising an organohydrogensiloxane containing at least three silicon-bonded hydrogen atoms per molecule. The liquid composition is covered with a layer of uncured silicone rubber that is curable by hydrosilation reaction in addition to being compatible with and adherent to the polyorganosiloxane gel. The gel is then placed over the uncured silicone rubber, after which the rubber and gel are concurrently cured. The cured silicone rubber exhibits a durometer hardness value of at least 10 on the Shore A scale, and the layer of silicone rubber is at least 3 mm. thick.

28 Claims, 1 Drawing Figure

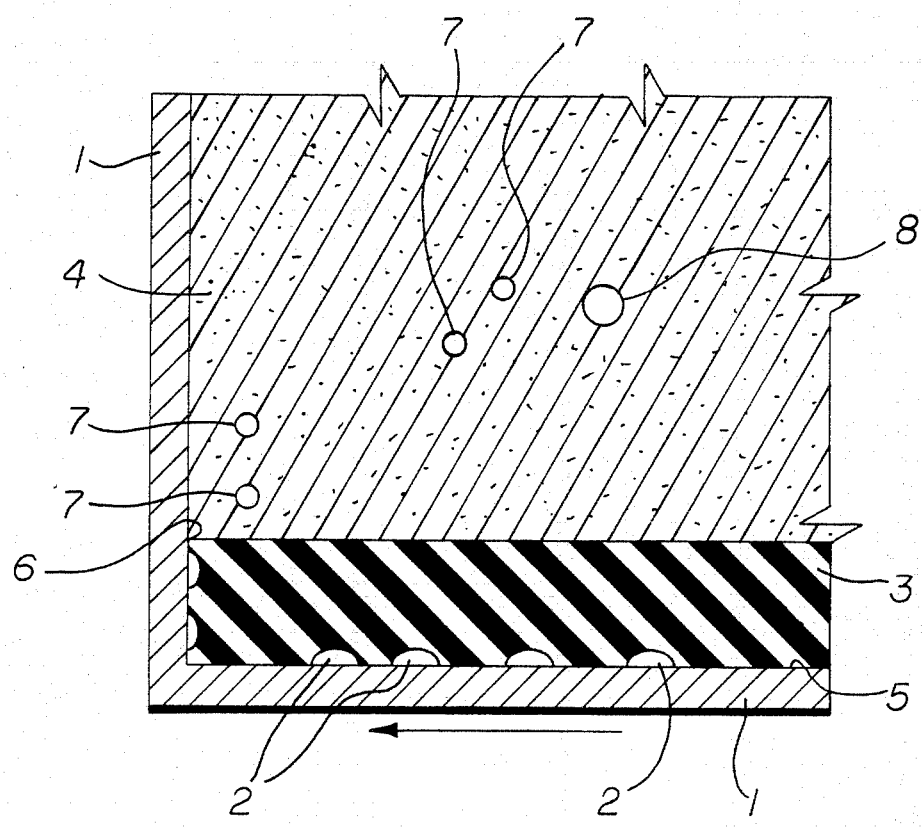

METHOD FOR SURFACE TREATMENT OF POLYORGANOSILOXANE GEL-FILLED CONTAINERS TO PREVENT BUBBLE MIGRATION INTO SAID GEL

BACKGROUND OF THE INVENTION

1. Field of the Invention

This invention relates to polyorganosiloxane gels. More particularly, this invention relates to container surfaces and other substrates that are in contact with polyorganosiloxane gels and to a method for treating these substrates to prevent the migration of bubbles from these substrates into the gel.

2. Background Information

Polyorganosiloxane gels are useful in numerous applications, including mammary prosthesis, as damping media and for the encapsulation of delicate electronic devices and circuits to protect them against damage by moisture and mechanical shocks. The use of polyorganosiloxanes as the light transmitting medium for a compressible optical waveguide device is disclosed in U.S. Pat. No. 4,128,299, which issued to J. Maher on Dec. 5, 1978, and in copending U.S. patent application Ser. No. 592,481 filed on Mar. 23, 1984.

Cured polyorganosiloxane gels are characterized as being relatively soft and deformable in comparison to polyorganosiloxane elastomers and resins. The cured gels are typically too soft to exhibit hardness values on any of the Shore durometer scales. Polyorganosiloxane gels are often characterized in terms of penetration values that are typically expressed as the depth to which the surface of the gel is depressed by a specified loading. Typical penetration values are within the range of from 1 to 10 mm or higher under a loading of 20 g. applied using a 1.6 cm.-diameter spherical foot.

If the gel is to be used as a light transmitting medium, it is often required that the cured gel remain optically clear and free of bubbles or other defects that could alter the optical properties of the gel. When a gel is in contact with a substrate such as the inner surface of a molded or extruded container exhibiting contour variations and/or irregularities, these variations and irregularities can serve as nucleation sites at which gases dissolved in the gel or trapped between the gel and the substrate can form bubbles. The gas can be air that becomes entrapped when the substrate is covered with the gel.

Irrespective of the means by which gaseous materials arrive at the surface of a substrate, bubble formation can occur when these gaseous materials contact potential nucleation sites present on the substrate. The elasticity of the gel allows bubbles to expand and/or coalesce as they migrate into the gel. The end result of this migration can be an irreversible alteration of the optical properties of the cured gel. The gel or the entire device or article must then be replaced, a costly and time consuming procedure.

Copending U.S. patent application Ser. No. 625,939, filed on June 29, 1984 teaches that bubble formation at the interface between a gel and a solid nonflowable substrate can be prevented by coating the substrate with a layer of an uncured extrudable silicone rubber composition that is compatible with the gel and becomes cohesively bonded thereto during simultaneous curing of the rubber and the gel by a platinum catalyzed hydrosilation reaction. It has now been found that while this technique substantially reduces the migration of bubbles into the gel composition, it does not eliminate it under conditions that may be encountered during the fabrication and use of gel containing devices.

SUMMARY OF THE INVENTION

The present invention is based on the discovery that the migration of bubbles from a surface of a container or other substrate into a polyorganosiloxane gel that is in contact with said substrate can be substantially eliminated by just coating the surface where bubble formation is likely to occur with a liquid or solubilized organohydrogensiloxane. A layer of uncured silicone rubber curable by a hydrosilation reaction is then applied over the coated areas, followed by the polyorganosiloxane gel. The gel and silicone rubber are then concurrently cured.

DESCRIPTION OF THE DRAWINGS

The accompanying drawing represents a partial cross-sectional view of a container filled with a polyorganosiloxane gel. A layer of cured silicone rubber at least 3 mm in thickness is interposed between the gel and an inner surface of the container but is not cohesively bonded to the underlying container surface. Such a container is outside the scope of the present invention in that the container surface was not coated with an organohydrogensiloxane composition prior to application of the silicone rubber layer.

A surface (1) of the container along which bubbles of gas (2) are present has been coated with a layer of silicone rubber (3) in an attempt to prevent the bubbles from migrating into the polyorganosiloxane gel (4). In the absence of significant adhesion between the surface (1) and silicone rubber layer, the bubbles will tend to migrate along the interface (5) between the silicone rubber layer and the surface to a common boundary (6) between the silicone rubber layer, a container surface and the gel. At this point the bubbles migrate into the relatively elastic gel and can detract from the aesthetics and/or optical properties of the gel. Two or more smaller bubbles (7) can subsequently coalesce to form a larger one (8).

DETAILED DESCRIPTION OF THE INVENTION

This invention provides a method for treating a substrate to prevent the migration of gas bubbles from the surface of said substrate into a polyorganosiloxane gel that is in contact with said surface, said method consisting essentially of the following sequence of steps: (I) coating at least a portion of said surface with a liquid composition comprising an amount of an organohydrogensiloxane sufficient to react with all hydrogen-reactive materials in contact with said organohydrogensiloxane, where said organohydrogensiloxane contains at least three silicon-bonded hydrogen atoms per molecule; (II) applying over said liquid composition a layer of uncured silicone rubber composition curable by a platinum-catalyzed hydrosilation reaction, where said layer is at least 3 mm thick and where said silicone rubber in the cured form exhibits a durometer of at least 10 on the Shore A scale; (III) placing said polyorganosiloxane gel in uncured form over said layer, said gel being curable by a platinum catalyzed hydrosilation reaction; and (IV) concurrently curing said gel and said uncured silicone rubber composition.

This invention also provides containers and other substrates wherein at least a portion of the surfaces of said containers or substrates are in contact with a polyorganosiloxane gel and have been treated in accordance with the present method. The treated surfaces are coated with a layer of cured silicone rubber that is cohesively bonded to said surfaces by means of the aforementioned organohydrogensiloxane. The silicone rubber layer is at least three millimeters thick, both the rubber and the gel are cured by a platinum catalyzed hydrosilation reaction, and the cured silicone rubber exhibits a durometer of at least 10 on the Shore A scale.

The foregoing term "hydrogen-reactive materials" includes all materials capable of reacting with silicon-bonded hydrogen atoms under the conditions used to cure the aforementioned silicone rubber and polyorganosiloxane gel. These hydrogen-reactive materials typically contain groups such as vinyl and hydroxyl that react with silicon-bonded hydrogen atoms at temperatures from 25° up to about 150° C. The hydrogen-reactive materials can be present in the substrate, in the silicone rubber layer or in the composition containing the organohydrogensiloxane.

The containers or other substrates that are treated in accordance with the present method can be formed from any organic or inorganic material capable of being coated with a coherent layer of the aforementioned liquid organohydrogensiloxane composition. The surfaces to be treated typically possess potential nucleation sites at which gaseous materials entrapped within the surfaces, between the surfaces and an overlying relatively elastic material such as a polyorganosiloxane gel or within the elastic material itself can form bubbles. These sites can be surface contours or irregularities formed during fabrication of the substrate, or can result from objects, such as electronic components, that are affixed to a substrate such as a printed circuit board. Typical materials for fabricating containers or other substrates that are subsequently overlaid with a polyorganosiloxane gel include metals such as aluminum and steel, ceramic materials such as the silicates of aluminum and magnesium and fiber reinforced composites formed by impregnating glass fibers with organic resins such as epoxides and phenol-formaldehyde condensation products.

Preferred materials for fabricating the substrates that are treated in accordance with the present method include organic polymers of the thermoplastic or thermosetting type. Polyurethane elastomers are particularly preferred on the basis of their physical and chemical properties.

In accordance with the present method at least one surface of the container or other substrate is coated with liquid organohydrogensiloxane composition. These organohydrogensiloxanes are polymers exhibiting a linear or branched molecular configuration and contain an average of at least three silicon-bonded hydrogen atoms per molecule, typically do not contain vinyl or other ethylenically unsaturated hydrocarbon radicals, and an average of no more than one hydrogen atom per silicon atom. The valences of the silicon atoms not occupied by hydrogen atoms are satisfied by oxygen atoms or by monovalent saturated hydrocarbon radicals. The organohydrogensiloxanes can be homopolymers, copolymers, or mixtures thereof, may contain one or more types of repeating units of the formulae $RSiO_{3/2}$, $R_2SiO$, $R_3SiO_{1/2}$ and $SiO_{4/2}$ in addition to one or more types of hydrogen-containing repeating units of the formulae $RHSiO$, $HSiO_{3/2}$ and $R_2HSiO_{1/2}$. In these formulae R represents a monovalent hydrocarbon or halohydrocarbon radical. Typically R represents an alkyl or haloalkyl radical containing from 1 to about 4 carbon atoms, a cycloalkyl radical or an aryl radical such as phenyl. Based on availability of the corresponding intermediates used to prepare organohydrogensiloxanes, R is preferably alkyl containing from 1 to 4 carbon atoms, phenyl or 3,3,3-trifluoropropyl. Most preferably R is methyl.

If the organohydrogensiloxane contains two or more types of units having R radicals, the hydrocarbon radicals represented by R in these units can be identical or different.

A particularly preferred organohydrogensiloxane is a trimethylsiloxy endblocked polymethylhydrogensiloxane containing about 1.6 weight percent of silicon-bonded hydrogen.

The organohydrogensiloxane can be applied to the substrate in undiluted form or as a solution or dispersion in an organic liquid or a liquid organosiloxane. Suitable organic liquids include hydrocarbons and halohydrocarbons such as pentane, hexane, cyclohexane, methylene chloride and chloroform. Preferred liquid organosiloxane solvents or dispersants for the organohydrogensiloxane include trimethylsiloxy endblocked polydimethylsiloxanes exhibiting viscosities from 0.001 to 1 Pa.s at 25° C. The solution or dispersion may also include at least one vinyl-containing polyorganosiloxane and/or a catalyst for the reaction of organohydrogensiloxanes with materials containing olefinically unsaturated hydrocarbon radicals. Known catalysts for this reaction, referred to as hydrosilation, include metals from the platinum group of the periodic table and compounds of these metals. It should be understood that when the organopolydiorganosiloxane contains both an olefinically unsaturated reactant and a hydrosilation catalyst, the composition should also include a suitable platinum catalyst inhibitor. Preferred catalysts and inhibitors are discussed hereinafter.

Because many of the preferred methylhydrogensiloxanes in the uncured state exhibit viscosities approaching that of water, to facilitate application of the methylhydrogensiloxane to the substrate it may be desirable to dissolve the siloxane in a higher viscosity liquid such as a trimethylsiloxy endblocked polydimethylsiloxane, or to prereact a portion of the silicon-bonded hydrogen atoms with an organosilane or polyorganosiloxane containing ethylenically unsaturated hydrocarbon groups, such as vinyl or allyl, bonded to silicon.

Irrespective of the form in which the liquid organohydrogensiloxane composition is applied as a substrate coating material, the silicon-bonded hydrogen content of the coating material should be in stoichiometric excess relative to hydrogen-reactive materials that come in contact with the organohydrogensiloxane during treatment of the substrate in accordance with the present method. As disclosed hereinafter, the silicone rubber composition that is applied over the organohydrogensiloxane composition typically includes a vinyl-containing polyorganosiloxane and an organohydrogensiloxane as a crosslinking agent in an amount sufficient to cure the composition, however the portion of vinyl-containing polyorganosiloxane that is in contact with the organohydrogensiloxane layer may react with this layer rather than its own crosslinking agent.

If, as presently believed, the organohydrogensiloxane serves to adhere the silicone rubber to the substrate, the organohydrogensiloxane layer should be as thin as can be applied using known techniques. Preferably the thickness of the coating is 0.1 mm or less.

The silicone rubber composition that is applied over the organohydrogensiloxane layer can be any of the known flowable or nonflowable compositions that can be cured using a platinum catalyzed hydrosilation reaction.

Typically, an silicone rubber composition contains at least one diorganovinylsiloxy endblocked polydiorganosiloxane (A) that exhibits a viscosity of from 0.1 to 50 Pa.s at 25° C., at least one organohydrogensiloxane (B) containing an average of at least three silicon-bonded hydrogen atoms per molecule and an amount of a platinum-containing catalyst sufficient to catalyze the reaction of (A) with (B).

The hydrocarbon radicals other than vinyl that are bonded to the silicon atoms of (A) and (B) can be any of those described hereinbefore in connection with the organohydrogensiloxane.

Polydiorganosiloxanes suitable for use as (A) are essentially linear molecules that may contain some branching resulting from trifunctional and tetrafunctional units that can be present as impurities in the polymers. Because of the manner in which (A) is prepared, some molecules may contain more than two vinyl radicals per molecule and some of the vinyl groups may not be located at the terminal positions of the polymer molecules. Reactant (A) can be a single polydiorganosiloxane or a mixture of two or more polydiorganosiloxanes wherein the viscosity of the mixture is from 0.1 to 50 Pa.s at 25° C.

Preferred silicone rubber compositions are disclosed in U.S. Pat. No. 4,162,242, which issued to Lee, Maxson and Stebleton on July 24, 1979, and in U.S. Pat. No. 4,427,801, which issued to Randall P. Sweet on Jan. 24, 1984. These patents are incorporated herein by reference.

The diorganovinylsiloxy endblocked polydiorganosiloxanes in preferred silicone rubber compositions are mixtures of polydimethylsiloxanes that collectively provide a molecular weight distribution such that there is present at least one polymeric species (1) at a concentration greater than the concentrations of polymeric species of lower and higher molecular weight. Polymeric species (1) is described as having a peak molecular weight, determined by gel permeation chromatography in the range of from 68,000 to 135,000. The molecular weight of the lowest molecular weight polymeric species is in the range of from 854 to 3146 and the molecular weight of the highest molecular weight species is in the range of from 174,000 to 370,000. The mixture of the various polymeric species present have a molecular weight distribution such that the dispersity index of the mixture has a value greater than 3.8.

The molar ratio of vinyl groups to silicon-bonded hydrogen atoms in the silicone rubber compositions of this invention is close to unity. In some instances it may be preferable to have a small stoichiometric excess of silicon-bonded hydrogen atoms or vinyl radicals in the composition.

The uncured extrudable silicone rubber composition should have sufficient integrity and thixotropic character that it will not flow to any appreciable extent under ambient conditions and will maintain its initial shape on a horizontal surface.

To effectively inhibit bubble migration along the interface between the silicone rubber layer and the substrate and, ultimately, into the polyorganosiloxane gel at a common boundary between the gel, substrate and silicone rubber layer, the rubber layer should be at least 3 mm thick prior to application of the gel. A thickness range of from 3 to about 10 mm is preferred. Thicker coatings will not appreciably increase the efficacy of the coating as a barrier against bubble migration.

The silicone rubber compositions suitable for use in accordance with the present method optionally contain a reinforcing filler such as finely divided silica to increase the tensile strength and durometer hardness of the cured elastomer. Preferred types of silica include fume and precipitated silicas that are often treated to prevent crepe hardening of the composition. Treating agents that can be employed are well known in the art and include silanes and siloxanes containing hydroxyl or other hydrolyzable groups on the molecule. Preferably the silicon atoms on the surface of the treated silica particles are bonded to trimethylsiloxy groups and vinyl-containing siloxy groups of the formula $CH_2=CH(CH_3)_2SiO[(CH_3)_2SiO]_x-$, $CH_2=CH(CH_3)(C_6H_5SiO[(CH_3)_2SiO]_x-$ where x is an integer from 0 to 20. Alternatively, the silicon atoms of the silica are bonded to organosiloxy groups consisting essentially of the repeating units

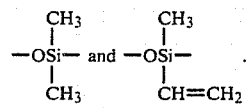

The toughness and durometer hardness of the cured silicone rubber can be further increased by including from 10 to 50%, based on the weight of vinyl endblocked polydiorganosiloxane, of a benzene-soluble resinous organosiloxane copolymer described hereinafter in connection with suitable polyorganosiloxane gels.

The silicone rubber composition is cured by the reaction of polydiorganosiloxane (A) with an organohydrogensiloxane (B) in the presence of a platinum-containing catalyst described hereinafter. Useful organohydrogensiloxanes are described hereinbefore in connection with the first layer of material applied to the substrate of the present composites.

The cured silicone elastomer should exhibit a durometer hardness on the Shore A scale of at least 10. In addition, the silicone rubber composition and the overlying polyorganosiloxane gel composition must be compatible and form a cohesive bond when cured in contact with one another. As used herein, the term "compatible" implies that an uncured gel and a layer of uncured extrudable silicone rubber will form a continuous boundary that is substantially free of voids.

The silicone rubber layer can be formed by applying an extrudable silicone rubber composition over the organohydrogensiloxane coating on the substrate. The composition can be applied as a continuous bead along the organohydrogensiloxane coating and converted to a substantially flat layer by the weight of the subsequently added gel.

Alternatively, a sheet of uncured silicone rubber of the appropriate dimensions that is curable by a platinum catalyzed hydrosilation reaction can be positioned over the organohydrogensiloxane coating. The gel is then placed over the rubber and the two are concurrently cured. In this instance, appropriate precautions should be taken during placement of the gel to prevent voids between the rubber and gel layers.

While not wishing to be bound by any theory, the cohesive bonding between the cured silicone rubber substrate and the container surface or other substrate in combination with the high durometer hardness value of the rubber are believed responsible for decreasing the likelihood that bubbles will migrate into the gel phase.

The polyorganosiloxane gels that are used in accordance with the present method can be any of those disclosed in the prior art, including the aforementioned patent to Nelson. Preferred gel compositions are exemplified hereinafter and in the aforementioned copending U.S. application Ser. No. 592,481.

Depending upon the physical properties required in cured gel, in addition to organohydrogensiloxanes identified hereinbefore as (B) there can be present at least one difunctional reactant in the form of a polyorganosiloxane containing an average of two silicon-bonded hydrogen atoms per molecule. Preferably the difunctional reactant is a polydiorganosiloxane containing a silicon-bonded hydrogen atom at each of the two terminal positions of the molecule.

If difunctional reactants are present in the gel composition, these can provide up to 90% or more of the available silicon-bonded hydrogen atoms and the ratio of total silicon-bonded hydrogen to vinyl radicals can be up to 3 to 1 or higher. In preferred gel compositions, the molar ratio of silicon-bonded hydrogen atoms to vinyl radicals is from 1.8 to 2.9 and difunctional reactants provide from 80 to 95 mol percent of this total.

If it is desired to increase the tear resistance or puncture resistance of the cured gel or make it more resilient, one method for accomplishing this is to include in the uncured gel composition up to 25%, based on the weight of polydiorganosiloxane (A), of a resinous organosiloxane copolymer containing repeating units of the formulae (a) $R_2^1(CH_2=CH)SiO_{0.5}$, (b) $R_3^2SiO_{0.5}$ and (c) $SiO_{4/2}$ where $R^1$ and $R^2$ are lower alkyl containing from 1 to 4 carbon atoms or phenyl, with the proviso that at least 95% of $R^1$ and $R^2$ are methyl. Most preferably all the $R^1$ and $R^2$ groups are methyl. The molar ratio of the combined (a) and (b) units to (c) units is from 0.6:1 to 1.1:1. Units represented by formula (a) constitutes from 2 to 8% by weight of the resin and the resin preferably contains at least two silicon-bonded vinyl groups per molecule of copolymer. In a preferred species of organopolysiloxane resin, the ranges for the ratio of (a) to (b) to (c) units are 5–10:40–45:45–50, with the proviso that the concentration of (a) units does not exceed about 8%, based on resin weight.

Resinous copolymers containing the aforementioned (a), (b) and (c) units can be prepared as described in U.S. Pat. No. 2,676,182, which issued to Daudt and Tyler on Apr. 20, 1954, and is hereby incorporated in its entirety by reference. The copolymers described in this patent contain from 2 to 3 percent by weight of hydroxyl groups, which is considerably above the maximum level of 0.3 weight percent desired for the resinous copolymer component of the present invention. The hydroxyl content of the resin is conveniently reduced to the desired level by employing a higher concentration of triorganosiloxane capping agent, or a precursor thereof, than the concentration range taught in the aforementioned U.S. Pat. No. 2,676,182. Briefly, this method comprises reacting under acidic conditions a silica hydrosol with organosubstituted siloxanes, such as hexamethyldisiloxane, or hydrolyzable triorganosilanes such as trimethylchlorosilane. To prepare the resins of this invention, the desired amount of the appropriate vinyl-containing silazane, siloxane or silane would also be present in the reaction mixture.

To achieve the maximum compatability and adhesion between the silicone rubber and gel layers, it is preferable that the silicon-bonded hydrocarbon radicals in both materials be identical. As disclosed hereinabove, most preferably all of these hydrocarbon radicals are methyl or vinyl.

Both the silicone rubber coating and the gel are cured by a hydrosilation reaction involving silicon-bonded vinyl or other ethylenically unsaturated hydrocarbon radicals with silicon-bonded hydrogen atoms. This reaction is typically catalyzed by platinum metal or a compound thereof. Other metals in the platinum group of the periodic table, such as rhodium and palladium, and compounds thereof may also be effective catalysts for curing the present polyorganosiloxane gels and silicone rubbers under certain conditions. In many instances the platinum group metals are considered equivalent catalysts for hydrosilation reactions, and all would be within the scope of the present invention.

A concentration of catalyst equivalent to from 0.1 to about 100 parts by weight of platinum per million parts by weight of curable gel or extrudable silicone rubber is usually sufficient to effectively catalyze a hydrosilation reaction at temperatures from 25° to 100° C. The catalyst can be any of the compatible platinum catalysts known to catalyze the addition of silicon-bonded hydrogen atoms to silicon-bonded vinyl radicals. Platinum catalysts can be any of the known forms which are compatible such as platinic chloride, salts of platinum, chloroplatinic acid and various complexes. Many of these platinum catalysts are described in U.S. Pat. No. 3,697,473, which issued to Polmanteer et al. on Oct. 10, 1972, and is hereby incorporated by reference to show platinum catalysts. One preferred class of platinum catalysts is described in U.S. Pat. No. 3,419,593 which issued to Willing on Dec. 31, 1968 and is hereby incorporated by reference to show the preparation of this class of platinum catalysts and provide additional catalyst descriptions. Of the class of platinum catalysts described in U.S. Pat. No. 3,419,593, the most preferred is a reaction product of chloroplatinic acid and a vinyl-siloxane having at least two dimethylvinylsiloxy units per molecule, with any additional siloxane units being dimethylsiloxane.

Both the polyorganosiloxane gel and extrudable silicone rubber compositions described hereinabove will begin to cure when all of the ingredients, including the platinum-containing catalyst are mixed together. In accordance with the present method, it is desirable to delay curing of the extrudable silicone rubber composition and the gel until these two materials are placed in contact with one another, at which time both materials are cured concurrently. It is therefore usually desirable to include a catalyst inhibitor in both materials that will retard the ambient temperature activity of the catalyst, but allow the catalyst to promote a relatively rapid curing at temperatures above about 50° C.

One suitable type of platinum catalyst inhibitor is described in U.S. Pat. No. 3,445,420 which issued on May 20, 1969, to Kookootsedes et al. and is hereby incorporated by reference to show certain acetylenic inhibitors and their use. A preferred class of acetylenic inhibitors are the acetylenic alcohols, especially 2-methyl-3-butyn-2-ol.

A second type of platinum catalyst inhibitor is described in U.S. Pat. No. 3,989,667, which issued to Lee and Marko on Nov. 2, 1976 and is hereby incorporated by reference to show certain olefinic siloxanes, their preparation and their use as platinum catalyst inhibitors.

A third type of platinum catalyst inhibitor is a polymethylvinylcyclosiloxane having three to six methylvinylsiloxane units per molecule. This type of inhibitor is typically less active than the two types mentioned hereinabove.

The optimum concentration of platinum catalyst inhibitor will provide the desired storage stability at ambient temperature without excessively prolonging the time interval required to cure the compositions at elevated temperatures. This amount can vary widely and is dependant upon the particular inhibitor, the nature and concentration of the platinum-containing catalyst and the nature of the organohydrogensiloxane.

Inhibitor concentrations as low as one mole of inhibitor per mole of platinum will in some instances yield a satisfactory level of storage stability and a desirably short curing period. In other cases, inhibitor concentrations of up to 10, 50, 100, 500 or more moles of inhibitor per mole of platinum may be needed. The optimum concentration for a particular inhibitor in a given silicone rubber or gel composition can be determined by routine experimentation.

The treated substrates of this invention can be prepared by first coating a dry, solid substrate, such as a container surface with an organohydrogensiloxane, followed by a layer of uncured silicone rubber composition that is curable by a platinum catalyzed hydrosilation reaction. The thickness of the rubber layer should be at least 0.3 cm. While the silicone rubber layer is still in an uncured form, an uncured organosiloxane gel composition that is curable by a platinum catalyzed hydrosilation reaction is placed over the rubber layer and the three materials are cured concurrently. Curing can be accomplished by heating the composite to a temperature of at least 50° C. or higher as may be required to activate the platinum curing catalyst.

It should be understood that the gel layer can be considerably thicker than the silicone rubber and layer. The present method encompasses coating one or more interior surfaces of a container with a layer of the aforementioned organohydrogensiloxane, applying a layer of silicone rubber composition over the organohydrogensiloxane prior to filling the container with a curable polyorganosiloxane gel composition, and finally curing the organohydrogensiloxane, silicone rubber composition and gel.

The following examples disclose preferred embodiments of the present invention but should not be interpreted as limiting the scope of the accompanying claims. All parts and percentages are by weight unless otherwise specified.

EXAMPLE 1

This Example demonstrates the effect of various coatings on the ability of bubbles to form and migrate from the wall of a container into a polyorganosiloxane gel confined therein. Containers were fabricated by sealing a sheet of clear polyurethane film to one side of a flat, polyurethane frame having a substantially rectangular opening measuring about 21 cm. by 17 cm. The thickness of the frame was about 0.5 cm. The polyurethane film completely covered the opening in the frame. One of two different polyorganohydrogensiloxane solutions (I and II) described in detail hereinafter was coated over the entire perimeter of the cavity defined by the opening in the frame. The same solution was also coated in a rectangular pattern as a 1.3 cm.-wide strip on the film. The outer perimeter of the coated area on the film was in contact with the frame along the entire perimeter of the opening in the frame. Six frames and adjoining film were coated with solution I and one with solution II.

Solution I contained 10% of an organohydrogensiloxane and 20 parts per million of a platinum complex in methylene chloride. Solution II contained 5% of the same organohydrogensiloxane and 10 parts per million of the same platinum catalyst in methylene chloride. The organohydrogensiloxane was a trimethylsiloxy endblocked polymethylhydrogensiloxane containing about 1.6 percent of silicon-bonded hydrogen atoms and an average of 57 methylhydrogensiloxane units per molecule. The platinum complex was a reaction product of chloroplatinic acid and divinyltetramethyldisiloxane diluted with a liquid dimethylvinylsiloxy endblocked polydimethylsiloxane to achieve a platinum content of 0.7 percent.

A continuous bead of an extrudable silicone rubber composition was applied along the entire boundary of the frame with the film. The extrudable rubber composition was prepared by mixing together the following ingredients to obtain a homogeneous composition:

84 parts of a dimethylvinylsiloxy endblocked polydimethylsiloxane (1) exhibiting a viscosity of about 30 Pa.s at 25° C.;

42 parts of a dimethylvinylsiloxy endblocked polydimethylsiloxane (2) exhibiting a viscosity of about 0.4 Pa.s at 25° C.;

2 parts of a hydroxyl-endblocked dimethylsiloxane/methylvinylsiloxane copolymer containing an average of 3.5 dimethylsiloxy units and 2.0 methylvinylsiloxy units per molecule;

3 parts of water;

10 parts of hexamethyldisilazane;

56 parts of fume silica;

4 parts of a trimethylsiloxy endblocked dimethylsiloxane/methylhydrogensiloxane copolymer (C) containing an average of 62.5 mole percent methylhydrogensiloxane units and an average of 0.8 weight percent silicon-bonded hydrogen atoms;

0.2 parts of the same platinum catalyst composition (D) present in the aforementioned solutions I and II; and 0.06 parts of 2-methyl-3-butyn-2-ol as a catalyst inhibitor.

The two polydimethylsiloxanes (1) and (2) provided a molecular weight distribution such that there was present at least one species having a molecular weight of from 68,000 to 135,000 that was present at a higher concentration than other molecular weight species present in (1) and (2), the lowest molecular weight species present had a molecular weight of from 854 to 3146, the highest molecular weight species present had molecular weight of from 174,000 to 370,000, and the mixture of (1) and (2) had a dispersity index greater than 3.8, determined by gel permeation chromatography.

Following the application of the silicone rubber composition, a second piece of polyurethane film, substantially identical in dimensions to that of the first film previously sealed to the frame, was coated in an identical pattern using the same organohydrogensiloxane solution previously used to coat the frame and was heat sealed to the frame with the coated side facing the coated side of the previously applied film such that the outer perimeter of the coating on the film coincided with the perimeter of the cavity defined by the opening in the frame. A small passage between the second film and the frame was intentionally left unsealed, through which the cavity formed by the two films and the aforementioned open area within the frame was completely filled with an organosiloxane gel obtained by combining the following ingredients to form a homogeneous mixture:

35 parts of polydimethylsiloxane (1) identified hereinabove;

8 parts of polydimethylsiloxane (2) identified hereinabove;

0.4 part of copolymer (3) identified hereinabove; 0.12 part of platinum catalyst composition (4) identified hereinabove;

36 parts of a 35 percent solution of a resinous benzene soluble organosiloxane copolymer in a dimethylvinylsiloxy terminated polydimethylsiloxane exhibiting a viscosity of about 2.1 Pa.s at 25° C. The organosiloxane copolymer contained repeating units of the formulae $(CH_2=CH)(CH_3)_2SiO_{1/2}$, $(CH_3)_3SiO_{1/2}$ and $SiO_{4/2}$ in a molar ratio of 0.09:0.8:1.0 and was prepared as described in U.S. Pat. No. 2,676,182. The copolymer contained 6.3% by weight of dimethylvinylsiloxy units;

19 parts of a dimethylhydrogensiloxy endblocked polydimethylsiloxane containing an average of 13.3 dimethylsiloxane units per molecule; and 0.18 part of a mixture of cyclic polymethylvinylsiloxanes.

The dimethylhydrogensiloxy endblocked polydimethylsiloxane provided 92 mol percent of the total silicon-bonded hydrogen atom content of the gel composition.

The contents of the cavities within the containers were deaired by placing the container in a vacuum chamber and subjecting them to a negative gauge pressure of 98 kilopascals for 45 minutes. The containers were then placed in a two-part mold wherein the cavity had substantially the same dimensions as the container and the mold was placed in a circulating air oven for between 12 and 15 minutes to cure the gel and silicone rubber composition. The oven temperature was 150° C. At the end of this period the mold was removed from the oven and allowed to cool to ambient temperature. At this time there were no observable bubbles in the gel portion of any of the twenty containers. After remaining under ambient conditions for at least 48 hours, the containers were placed in a circulating air oven for twelve hours. The oven temperature was 66° C. The container was examined at one hour intervals to determine whether any bubbles were present. At the end of this heat test, the containers were placed in a vacuum chamber under a negative gauge pressure of 40.5 kPa for twelve hours, removed from the vacuum chamber and allowed to remain under ambient conditions for five days and finally again placed in the vacuum chamber for four hours under a negative gauge pressure of 40.5 kPa. At the conclusion of this test cycle, the containers were examined to determine the presence of bubbles in the gel phase.

In those instances where bubbles were observed in the gel phase during the test cycle, the container was opened to determine the degree of adhesion between the cured silicone rubber layer and the walls of the cavity. The perimeter of the cavity was also visually examined to determine the presence of protuberances or ridges in the film along the line defining the intersection of the film with the frame.

Of the 20 containers tested, four of the gels contained bubbles at the completion of the testing procedure. In no instance did bubbles form during the first heating test. Of these four failures, two containers were found to have ridges in one of the films along the line of intersection between the film and the frame, and in one container the cured silicone rubber layer could be easily pulled away from the film along the edge where bubble formation had occurred. The silicone rubber and film could not be separated along the opposite side of the frame. Two of the containers with bubbles had been prepared using organohydrogensiloxane solution I described hereinbefore, and two employed organohydrogensiloxane solution II.

The ability of the combination of a silicone rubber layer and a layer of organohydrogensiloxane to reduce the migration of bubbles into a gel-filled cavity can be demonstrated by comparing the foregoing results with those obtained from six containers wherein the silicone rubber and organohydrogensiloxane layers were absent. Containers were fabricated using polyurethane frames and films as described hereinbefore. In this instance no coating or silicone rubber was applied to the frame and adjoining film prior to filling the cavities with the organosiloxane gel composition described in the first part of this Example. The containers were then deaired, sealed, and the contents cured as described in the first part of this Example. The containers remained under ambient conditions for 72 hours and were then placed in a circulating air oven at a temperature of 66° C. for six hours, during which time they were withdrawn and examined at hourly intervals. At the end of one hour, there were at least six bubbles measuring about 0.3 cm in diameter along the gel-frame interfaces in all the containers. Following completion of the heating cycle, the containers were allowed to remain under ambient conditions for 24 hours, at which time they were placed in a vacuum chamber for six hours under a negative gauge pressure of 37 kPa. During this period the bubbles increased in diameter to between 0.6 and 2.5 cm. Some of the smaller bubbles had coalesced to form larger ones.

EXAMPLE 2

This example demonstrates the increased adhesion between a cured silicone rubber and a polyurethane that can be achieved using a layer of organohydrogensiloxane in accordance with the present invention.

A polyurethane film was heat sealed to one side of two polyurethane frames. The films and frames were substantially identical to those described in the preceding Example 1. The perimeter of the cavity and an adjoining 1.3 cm.-wide strip of film were coated with solution I as described in the preceding Example 1. A bead of the same extrudable silicone rubber composition described in Example 1 was then applied over the layer of solution I along the border between the frame and the film.

A second test sample was prepared using the same procedure, but omitting the coating of organohydrogensiloxane (solution I). Both test samples were then cured by placing them in a circulating air oven for 2 hours at a temperature of 66° C. After the specimens had cooled to ambient temperature, one end of the cured bead was grasped and pulled in an attempt to separate it from the wall of the cavity. The rubber which had been applied without solution I separated easily from the polyurethane film and frame, leaving both materials intact. The test sample that had been coated with solution I containing an organohydrogensiloxane exhibited cohesive failure. The cured silicone rubber could be removed only by applying considerable force, and not without simultaneously tearing out a few fragments of polyurethane from the frame.

That which is claimed is:

1. A method for treating a substrate to prevent the migration of gas bubbles from the surface of said substrate into a polyorganosiloxane gel that is in contact with said surface, said method consisting essentially of the following sequence of steps:
   (I) coating at least a portion of said surface with a liquid composition comprising an amount of an organohydrogensiloxane sufficient to react with all hydrogen-reactive materials in contact with said organohydrogensiloxane, where said organohydrogensiloxane contains at least three silicon-bonded hydrogen atoms per molecule;
   (II) applying over said liquid composition a layer of uncured silicone rubber composition curable by a platinum-catalyzed hydrosilation reaction, where said layer is at least 3 mm thick and where said silicone rubber in the cured form exhibits a durometer of at least 10 on the Shore A scale;
   (III) placing said polyorganosiloxane gel in uncured form over said layer, said gel being curable by a platinum catalyzed hydrosilation reaction; and
   (IV) concurrently curing said gel and said uncured silicone rubber composition.

2. A method according to claim 1 where said polyorganosiloxane gel in an uncured form comprises the product obtained by mixing
   (A) at least one diorganovinylsiloxy endblocked polydiorganosiloxane exhibiting a viscosity of from 0.1 to 50 Pa.s at 25° C.,
   (B) at least one polyorganohydrogensiloxane containing an average of at least three silicon-bonded hydrogen atoms per molecule in an amount sufficient to cure said polyorganosiloxane gel, and
   (C) platinum or a platinum compouhd in an amount sufficient to catalyze curing of said polyorganosiloxane gel.

3. A method according to claim 2 where said polyorganosiloxane gel in the uncured form includes at least one polydiorganosiloxane containing a silicon-bonded hydrogen atom at each of the two terminal positions, the molar ratio of silicon-bonded hydrogen atoms to vinyl groups present in said gel is from 1.8 to 2.9 and said polydiorganosiloxane provides from 80 to 95 mol percent of the silicon-bonded hydrogen atoms present in said gel.

4. A method according to claim 1 where silicon-bonded hydrocarbon radicals present in said uncured silicone rubber composition and said polyorganosiloxane gel are vinyl and methyl.

5. A method according to claim 2 where said polyorganosiloxane gel in the uncured form includes up to 25%, based on the weight of (A), of a resinous, benzene soluble copolymer consisting essentially of repeating units of the formulae (a) $(CH_3)_2CH_2=CHSiO_{0.5}$, (b) $(CH_3)_3SiO_{0.5}$ and (c) $SiO_{4/2}$ where the molar ratio of combined (a) and (b) units to (c) units is from 0.6:1 to 1.1:1, units represented by formula (a) constitute from 2 to 8% by weight of the copolymer, the copolymer contains at least two vinyl groups per molecule and the molar ratio of (a) to (b) to (c) units is 5–10:40–45:45–50, with the proviso that the concentration of (a) units does not exceed 8% of the total weight of said copolymer.

6. A method according to claim 1 where said silicone rubber composition is extrudable and comprises a diorganovinylsiloxy endblocked polydiorganosiloxane, an organohydrogensiloxane containing at least three silicon-bonded hydrogen atoms per molecule in an amount sufficient to cure said composition and a platinum-containing hydrosilation catalyst in an amount sufficient to promote curing of said composition at temperatures above 50° C.

7. A method according to claim 6 where said polydiorganosiloxane is a mixture of polydimethylsiloxanes that collectively provides a molecular weight distribution such that there is present at least one polymeric species (1) at a concentration greater than the concentrations of polymeric species of lower and higher molecular weight, said species (1) having a molecular weight, determined by gel permeation chromatography, within the range from 68,000 to 135,000, where the lowest molecular weight species is within the range from 854 to 3146, the highest molecular weight species is within the range from 174,000 to 370,000 and the various polymeric species exhibit a molecular weight distribution such that the mixture exhibits a dispersity index greater than 3.8.

8. A method according to claim 1 where said extrudable silicone rubber composition and said uncured polyorganosiloxane gel composition include a platinum catalyst inhibitor.

9. A method according to claim 1 where said organohydrogensiloxane is a methylhydrogensiloxane.

10. A method according to claim 1 where said first layer included a platinum-containing hydrosilation catalyst.

11. A method according to claim 1 where said first layer is applied as a solution in an organic solvent.

12. A method according to claim 11 where said solvent is methylene chloride.

13. A method according to claim 1 where said substrate comprises an organic elastomer.

14. A method according to claim 13 where said organic elastomer is a polyurethane.

15. A composite consisting essentially of (I) a substrate wherein at least one surface thereof is coated with (II) a layer of cured silicone rubber that is cohesively bonded to said substrate by means of an organohydrogensiloxane and (III) a cured polyorganosiloxane gel overlaying said silicone rubber and cohesively bonded thereto, where said layer of silicone rubber is at least three millimeters thick, said silicone rubber exhibits a durometer of at least 10 on the Shore A scale, and where said organohydrogensiloxane, silicone rubber and polyorganosiloxane gel are cured concurrently by means of a platinum catalyzed hydrosilation reaction.

16. A composite according to claim 15 where said polyorganosiloxane gel in the uncured form comprises the product obtained by mixing
   (A) at least one diorganovinylsiloxy endblocked polyorganosiloxane exhibiting a viscosity of from 0.1 to 50 Pa.s at 25° C.,
   (B) at least one polyorganohydrogensiloxane containing an average of at least three silicon-bonded hydrogen atoms per molecule in an amount sufficient to cure said polyorganosiloxane gel, and (C) platinum or a platinum compound in an amount sufficient to catalyze curing of said polyorganosiloxane gel composition.

17. A composite according to claim 16 where said polyorganosiloxane gel composition in the uncured form includes at least one polydiorganosiloxane containing a silicon-bonded hydrogen atom at each of the two terminal positions, the molar ratio of silicon-bonded hydrogen atoms to vinyl groups present in said gel is from 1.8 to 2.9 and said polydiorganosiloxane provides from 80 to 95 mol percent of the silicon-bonded hydrogen atoms present in said gel.

18. A composite according to claim 15 where silicon-bonded hydrocarbon radicals present in said silicone rubber and said polyorganosiloxane gel are vinyl and methyl.

19. A composite according to claim 16 where said product includes up to 25%, based on the weight of (A), of a resinous, benzene soluble copolymer consisting essentially of repeating units of the formulae (a) $(CH_3)_2CH_2=CHSiO_{0.5}$, (b) $(CH_3)_3SiO_{0.5}$ and (c) $SiO_{4/2}$ where the molar ratio of combined (a) and (b) units to (c) units is from 0.6:1 to 1.1:1, units represented by formula (a) constitute from 2 to 8% by weight of the copolymer, the copolymer contains at least two vinyl groups per molecule and the molar ratio of (a) to (b) to (c) units is 5–10:40–45:45–50, with the proviso that the concentration of (a) units does not exceed 8% of the total weight of said copolymer.

20. A composite according to claim 15 where said silicone rubber in the uncured form comprises the product obtained by mixing a diorganovinylsiloxy endblocked polydiorganosiloxane, an organohydrogensiloxane containing at least three silicon-bonded hydrogen atoms per molecule in an amount sufficient to cure said composition and a platinum-containing hydrosilation catalyst in an amount sufficient to promote curing of said composition at temperatures above 50° C.

21. A composite according to claim 20 where said polydiorganosiloxane is a mixture of polydimethylsiloxanes that collectively provides a molecular weight distribution such that there is present at least one polymeric species (1) at a concentration greater than the concentrations of polymeric species of lower and higher molecular weight, said species (1) having a molecular weight, determined by gel permeation chromatography, within the range from 68,000 to 135,000, where the lowest molecular weight species is within the range from 854 to 3146, the highest molecular weight species is within the range from 174,000 to 370,000 and the various polymeric species exhibit a molecular weight distribution such that the mixture exhibits a dispersity index greater than 3.8.

22. A composite according to claim 15 where the uncured forms of said silicone rubber and said gel include a platinum catalyst inhibitor.

23. A composite according to claim 15 where said organohydrogensiloxane is a methylhydrogensiloxane.

24. A composite according to claim 15 where said organohydrogensiloxane includes a platinum-containing hydrosilation catalyst.

25. A composite according to claim 15 where said organohydrogensiloxane is applied to said surface as a solution in an organic solvent.

26. A composite according to claim 25 where said organic solvent is methylene chloride.

27. A composite according to claim 15 where said substrate comprises an organic polymer.

28. A composite according to claim 27 where said organic polymer is a polyurethane.

* * * * *

UNITED STATES PATENT AND TRADEMARK OFFICE
CERTIFICATE OF CORRECTION

PATENT NO. : 4,528,243

DATED : July 9, 1985

INVENTOR(S) : Gust John Kookootsedes & Herschel Henry Reese

It is certified that error appears in the above-identified patent and that said Letters Patent is hereby corrected as shown below:

Column 2, line 11 - "just" to --- first --- .
Column 3, line 54 - Insert "a" immediately preceding "liquid".
Column 4, line 37 - Delete "organopolydiorganosiloxane" and substitute therefor---polydiorganosiloxane --- .
Column 5, line 11 - Change "an" to --- a --- .
Column 5, line 55 - Change "have" to --- has --- .
Column 6, line 26 - Formula should read
--- $CH_2 = CH(CH_3)(C_6H_5)SiO[(CH_3)_2SiO_x]$- 
Column 7, line 18 - Insert --- the --- immediately preceding the word "cured" .
Column 10, line 46 - Delete "(C)" and substitute therefor --- (3) --- .
Column 10, line 50 - Delete "(D)" and substitute therefor --- (4) --- .
Column 11, line 56 - Delete "container was" and substitute therefor --- containers were --- .
Column 14, line 39 - Delete "included" and substitute therefor --- includes --- .

Signed and Sealed this

Twenty-fourth Day of December 1985

[SEAL]

Attest:

DONALD J. QUIGG

Attesting Officer

Commissioner of Patents and Trademarks